United States Patent
Paranjpe et al.

[11] Patent Number: 5,249,865
[45] Date of Patent: Oct. 5, 1993

[54] INTERFEROMETRIC TEMPERATURE MEASUREMENT SYSTEM AND METHOD

[75] Inventors: Ajit P. Paranjpe, Dallas; Steven A. Henck, Plano; Walter M. Duncan, Dallas, all of Tex.

[73] Assignee: Texas Instruments Incorporated, Dallas, Tex.

[21] Appl. No.: 874,658

[22] Filed: Apr. 27, 1992

[51] Int. Cl.$^5$ .................. G01J 5/58; G01K 11/00
[52] U.S. Cl. .................. 374/161; 374/120; 356/43; 356/351
[58] Field of Search ............ 374/161, 121, 130, 120; 356/351, 43

[56] References Cited
U.S. PATENT DOCUMENTS

| | | | |
|---|---|---|---|
| 3,422,678 | 1/1969 | Murray | 374/126 |
| 3,462,224 | 8/1969 | Woods et al. | 374/126 |
| 3,950,987 | 4/1976 | Slezinger et al. | 374/163 |
| 4,140,393 | 2/1979 | Cetas | 374/161 |
| 4,498,765 | 2/1985 | Herve | 374/126 |
| 4,707,147 | 11/1987 | Aoki et al. | 374/161 |
| 4,970,385 | 11/1990 | Tatsuno et al. | 374/161 |
| 5,011,295 | 4/1991 | Krishnan et al. | 374/126 |

FOREIGN PATENT DOCUMENTS 0821960  4/1981  U.S.S.R. .................. 374/161

*Primary Examiner*—William A. Cuchlinski, Jr.
*Assistant Examiner*—Diego F. F. Gutierrez
*Attorney, Agent, or Firm*—Peter T. Rutkowski; Richard C. Donaldson; William E. Hiller

[57] ABSTRACT

An interferonmetric temperature measurement system is described for determining the temperature of a sample. The system comprises three detectors for measuring various intensities of a beam of electromagnetic radiation reflected off the sample and circuitry for determining the temperature from the intensities. The detectors measure the intensity of the beam and two orthogonally polarized components of the beam.

6 Claims, 1 Drawing Sheet

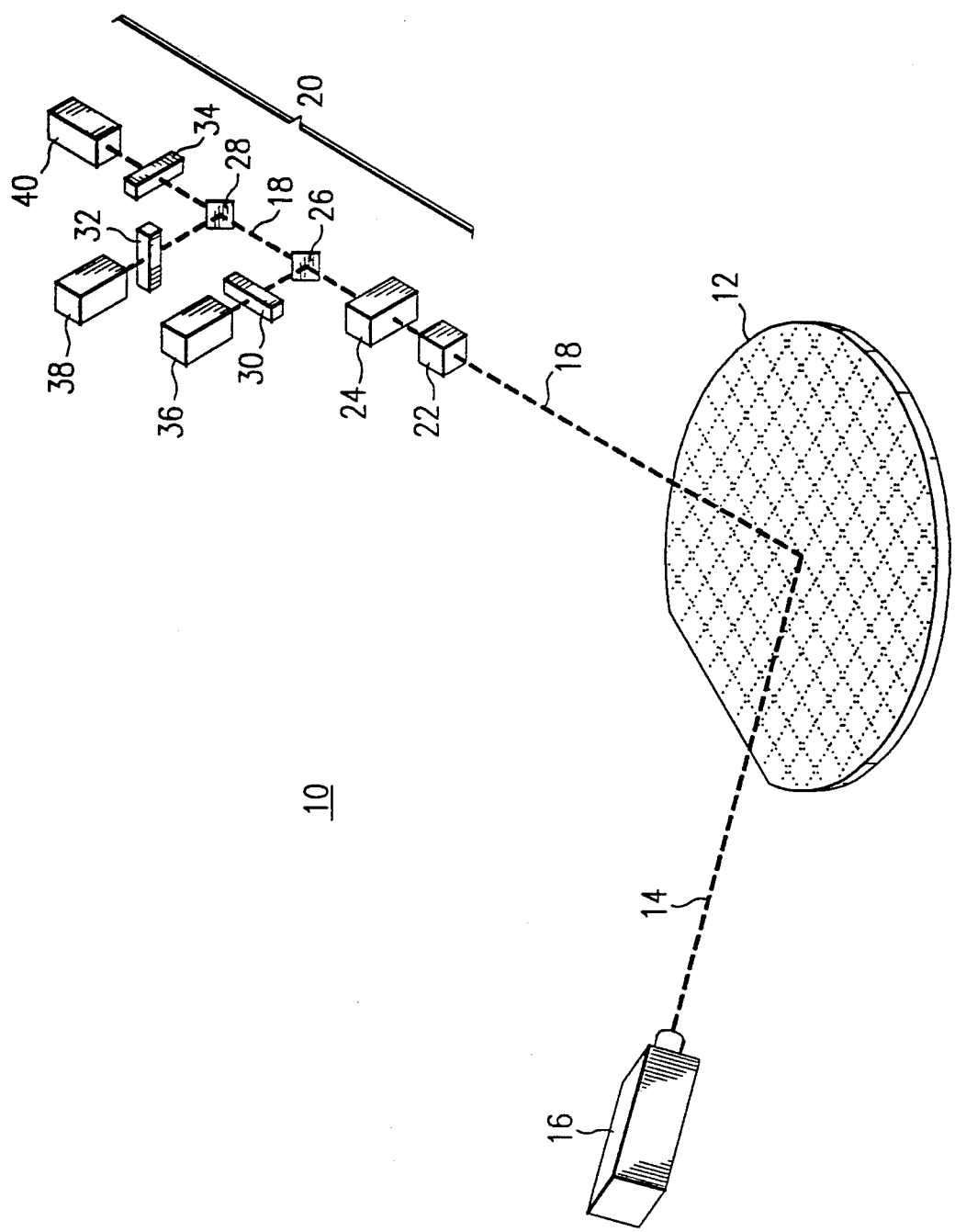

INTERFEROMETRIC TEMPERATURE MEASUREMENT SYSTEM AND METHOD

TECHNICAL FIELD OF THE INVENTION

This invention relates in general to the field of electro-optical systems and more particularly to an interferometric temperature measurement system and method.

BACKGROUND OF THE INVENTION

Precise wafer temperature control is vital during all thermally activated steps of the integrated circuit fabrication process. These processes include epitaxial and oxide growth, and dielectric and metal film depositions. The trend towards single wafer processing rather than batch processing requires accurate wafer temperature measurement for successful temperature control. Presently, one of the major impediments for temperature control is the lack of a direct and non-contact measurement of the surface temperature of silicon wafers during processing.

Thermocouples are the most common form of temperature monitoring devices in prior processing equipment. Thermocouples have several disadvantages; chief among them is that they contact the wafer. Poor contact causes a loss of accuracy, and contact with the wafer front side damages the wafer, or perturbs the process. Another problem is the lag between the measured temperature and the actual temperature due to the thermal mass of the thermocouple. The thermal mass causes the temperature at the contact point to differ from the true wafer temperature during temperature transients. There are also problems associated with the presence of the metal thermocouple in the harsh environment of the processing chamber. Frequently, the thermocouples are attacked by the process gases, and their output is perturbed by RF voltages during plasma processes.

Pyrometry, which offers a direct, non-contact measurement of temperature, also has several disadvantages. The chief disadvantage of pyrometry is its reliance upon the emissivity of silicon. The emissivity of silicon is a strong function of temperature in the temperature domain of interest. This drawback theoretically could be overcome with an independent measurement of the emissivity, but this has proven difficult to do.

There have been several attempts to use ellipsometry to measure the temperature of silicon substrates. While these techniques are direct and non-contacting, they use expensive ellipsometers with moving parts, and rely on the temperature dependence of n, the real part of the refractive index, to determine the temperature. Since k, the imaginary part of the refractive index, rather than n is more sensitive to wafer temperature, it is preferable to measure k.

Therefore, a need has arisen for a temperature measurement technique which is accurate, which does not interact with wafer processes nor contacts the wafer, and which is inexpensive.

SUMMARY OF THE INVENTION

In accordance with the present invention, an interferometric temperature measurement system and method is provided which substantially eliminates or reduces disadvantages and problems associated with prior temperature measurement systems.

An interferometric temperature measurement system is described for determining the temperature of a sample. The system comprises three detectors for measuring various intensities of a beam of electromagnetic radiation reflected off of the sample and circuitry for determining the temperature from the intensities. The detectors measure the intensity of the beam and two orthogonally polarized components of the beam.

A first technical advantage of the disclosed invention is its accuracy. The measured quantity, S(T), is affected only by phase shifts between the P and S polarized components of a coherent beam of light. These shifts are caused by absorption in the sample. Thin transparent films on the sample do not affect the accuracy of the measurement.

A second technical advantage of the disclosed invention is its precision. As long as only the specularly reflected components are imaged by the detector, the measurement will be relatively insensitive to surface roughness of the sample and to scattering elsewhere in the optical path.

A third advantage of the disclosed invention is its dependence only upon the temperature of the sample. This dependence may be calculated a priori alleviating the need for individual sensor calibration.

A fourth technical advantage of the disclosed invention is its simplicity. The invention may be practiced exclusively with fixed optical components. This increases reliability and decreases cost.

BRIEF DESCRIPTION OF THE DRAWINGS

For a more complete understanding of the present invention, and the advantages thereof, reference is now made to the following descriptions taken in conjunction with the accompanying drawing which shows a schematic diagram of a temperature measurement system embodying the disclosed invention.

DETAILED DESCRIPTION OF THE INVENTION

The preferred embodiment of the present invention and its advantages are best understood by referring to the drawing.

Optical constants of materials, $(n-ik)$, are a function of the temperature of the material. The two constants, however, behave differently from one another. For instance, the real part of the refractive index (n) changes by less than 10% while the imaginary part of the refractive index (k) changes by a factor of 7 from 0°–900° C. for silicon. Thus, it is desirable to monitor changes in k for deducing the temperature.

The reflection coefficient of light incident on a polished surface is a function of the optical constants n and k of the material, the angle of incidence, and the state of polarization of the incident light. The expressions for the reflection coefficients for the P and S polarized components are $$R_P = \frac{\left(1 - n\frac{\cos\theta_1}{\cos\theta_2}\right) + i\frac{k}{n}}{\left(1 + n\frac{\cos\theta_1}{\cos\theta_2}\right) + i\frac{k}{n}} \quad (1)$$

$$R_S = \frac{\left(1 - n\frac{\sec\theta_1}{\sec\theta_2}\right) + i\frac{k}{n}}{\left(1 + n\frac{\sec\theta_1}{\sec\theta_2}\right) + i\frac{k}{n}} \quad (2)$$

where $\theta_1$ and $\theta_2$ are the angle of incidence and angle of refraction respectively, and $R_P$ and $R_S$ are the reflection coefficients for the P and S polarized components, respectively. Both $R_P$ and $R_S$ are complex.

The incident light upon reflection suffers a change in amplitude and phase relative to the incident beam. For light of unit intensity incident on a surface, the intensity of the reflected light is $R^2$. The phase shift upon reflection is given by the phase angle of the reflection coefficient. The magnitude and phase of the reflection coefficients are $$|R_P|^2 = \frac{\left(1 - n\frac{\cos\theta_1}{\cos\theta_2}\right)^2 + \left(\frac{k}{n}\right)^2}{\left(1 + n\frac{\cos\theta_1}{\cos\theta_2}\right)^2 + \left(\frac{k}{n}\right)^2} \quad (3)$$

$$|R_S|^2 = \frac{\left(1 - n\frac{\sec\theta_1}{\sec\theta_2}\right)^2 + \left(\frac{k}{n}\right)^2}{\left(1 + n\frac{\sec\theta_1}{\sec\theta_2}\right)^2 + \left(\frac{k}{n}\right)^2} \quad (4)$$

$$\phi_P = \arctan\left(\frac{k/n}{1 - n\frac{\cos\theta_1}{\cos\theta_2}}\right) - \arctan\left(\frac{k/n}{1 + n\frac{\cos\theta_1}{\cos\theta_2}}\right) \quad (5)$$

$$\phi_S = \arctan\left(\frac{k/n}{1 - n\frac{\sec\theta_1}{\sec\theta_2}}\right) - \arctan\left(\frac{k/n}{1 + n\frac{\sec\theta_1}{\sec\theta_2}}\right) \quad (6)$$

where $\phi_P$ and $\phi_S$ are the phase shifts for the P and S polarization components, respectively.

The phase shift $\phi_P$ (Equation 5), is linearly proportional to $k/n$. At the Brewster angle $$1 - n\frac{\cos\theta_1}{\cos\theta_2} = 0 \quad (7)$$

The phase shift thus increases as the Brewster angle is approached. Reasonable sensitivity, however, is possible a few degrees away from Brewster angle. For a given deviation from the Brewster angle, the sensitivity is higher if the incidence angle exceeds the Brewster angle.

Accurate phase shift measurement requires interferometry. Thus, if the reflected beam ("probe beam") from the sample is interfered with a reference beam of the same intensity, the phase shift can be derived from the resultant beam intensity. If two beams of equal intensity ($I_0$) and phase shifted by an angle $\Delta$ with respect to each other interact, the resultant intensity is given by $$I = 2I_0(1 + \cos\Delta) \quad (8)$$

The two beams interfere constructively for $\Delta = 0$ and destructively for $\Delta = 180$ deg.

To implement such a system, a coherent light source such as a laser beam is split in two. One half of the light source forms the reference. The second half forms the probe beam. The two beams are reflected off of the material of interest, combined and the resultant intensity monitored. This can be achieved if the probe beam is chosen to be the P polarized component of a laser beam, while the S polarized component serves as the reference beam.

Orthogonally polarized components, however, cannot interfere. Their electric fields lie in orthogonal planes. Inserting a polarizer at 135 degrees overcomes this obstacle. The polarizer serves two purposes:

(1) The components of the electric field in the plane of the polarizer are selectively transmitted by the polarizer. The P and S polarized components are part of a single beam and are in phase before striking the measured material in the incident beam. They are phase shifted with respect to each other in the reflected beam.

(2) By orienting the polarizer at 135 degrees, the reference beam is phase shifted approximately 180 degrees with respect to the probe beam.

Thus, if $\Delta = \phi_P - \phi_S$, the resultant intensity is given by $$I = I_0(1 - \cos\Delta) \quad (9)$$

This assumes that the intensities of the probe and of the reference beam are equal at the detector plane. This condition will normally not be met. An adjustable polarizer may be placed in the path of the incident beam to adjust the intensities of the S and P polarized components such that this condition is met. The present invention may be practiced without the previous condition being met. Equations 9 through 11, however, must be modified accordingly.

As the temperature of the sample increases, the magnitude of $R_P$ and $R_S$ of the reflected beam change (see Equations 1 and 2), causing the intensities of the P and S polarized beams to become unequal. It can be shown that the quantity $1 - \cos\Delta$ can be evaluated from the resultant intensity provided the intensities of the S and P polarized beams are separately measured at the detector plane. If the intensities of the P and S polarized components at the detector plane are $I'_P$ and $I'_S$, respectively, and the resultant intensity is I, then $1 - \cos\Delta$ can be evaluated by the function $S(T)$:

$$S(T) = 1 - \cos\Delta = \frac{1}{2}\left[\frac{I/I'_S - \delta^2/I'_S}{1 + \delta/\sqrt{I'_S}}\right] \quad (10)$$

where the quantity $\delta$ is given by:

$$\delta = \sqrt{I'_P} - \sqrt{I'_S} \quad (11)$$

Variation of the signal $S(T)$ may be used to directly measure the temperature of the sample. For silicon, the signal $S(T)$ changes by more than a factor of 20 over the temperature range of 0° to 900° C. Uncertainty in wafer temperature due to uncertainties in incident angle has been shown to be less than 10° C.

The drawing is a schematic diagram of a temperature measurement system embodying the disclosed invention, indicated generally at 10. System 10 measures the temperature of a silicon wafer 12 from which a set of integrated circuits is fabricated. System 10 determines the temperature of wafer 12 by reflecting a coherent light beam 14 generated by a laser 16 off of wafer 12. Incident beam 14 is reflected off of wafer 12 to form a reflected beam 18. The phase angle of the S and P components of reflected beam 18 are modified by wafer 12 as described above. Reflected beam 18 is then measured by detector circuitry 20. Detector circuitry 20 measures those parameters of equation 10 necessary to generate the signal S(T).

Detector circuitry 20 comprises a spatial filter 22, a first polarizer 24, a first and second beam splitter 26 and 28, respectively, a second, third and fourth polarizer 30, 32 and 34, respectively, and a first, second and third light detector 36, 38, and 40, respectively. As depicted, beam splitters 26 and 28 direct a portion of reflected beam 18 off its original path, through a polarizer and to a light detector. In particular beam splitter 26 directs a portion of reflected beam 18 to detector 36 through polarizer 30 Beam splitter 28 directs a portion of reflected beam 18 to detector 38 through polarizer 32.

Polarizer 30 and Polarizer 32 are aligned with respect to reflected beam 18 such that they let only the S and P components of reflected beam 18 pass to detectors 36 and 38, respectively. Spatial filter 22 ensures that only the specularly reflected portion of reflected beam 18 passes through and to the other components of detector circuitry 20.

In operation, detector circuitry 20 is initialized at room temperature. Because no modulating elements are used in the disclosed invention, the intensities of the S and P component of reflected beam 18 must be measured off-axis. Thus, a calibration between the off-axis intensity measured by detectors 36 and 38 and an on-axis measurement by detector 40 is necessary. Polarizer 34 is set to 0° so that only the P polarized component passes to detector 40. By rotating polarizer 24, a table of values of $I_P$ (off-axis P intensity) and $I'_P$ may be prepared. Next, polarizer 34 is set to 90° so that only the S polarized component passes to detector 40, and a table of values of $I_S$ (off-axis S intensity) and $I'_S$ is prepared. From these tables the following relations may be derived:

$$I'_P = C_1 I_P + C_2 \quad (12)$$

$$I'_S = C_3 I_S + C_4 \quad (13)$$

Polarizer 24 is rotated such that the following condition is satisfied at a predetermined temperature (e.g. room temperature):

$$C_1 I_P + C_2 = C_3 I_S + C_4 \quad (14)$$

Once set, polarizer 24 is fixed in position. Sensitivity is maximized by achieving the condition represented by equation 14.

Finally, linear polarizer 34 is set at 135°. $I_S$, $I_P$, and I are measured from detectors 36, 38 and 40, respectively. The quantities $I'_P$ and $I'_S$ are calculated from Eqns. 12 and 13. S(T) is calculated from Eqn. 10. The angle of incidence can be determined from S(T) at room temperature. Several measurements of S(T) at known elevated temperatures are preferred to determine the incidence angle to within 0.1°.

The output from detectors 36, 38 and 40 may be routed to an electronic circuit within one of the detectors for the calculation of S(T) or to a stand-alone processor (not shown). Also, it should be understood that although detector circuitry 20 comprises separate components, elements 22 through 40 may be integrated into a single system by one skilled in the art.

Although the present invention and its advantages have been described in detail, it should be understood that various changes, substitutions and alterations can be made herein without departing from the spirit and scope of the invention as defined by the appended claims.

What is claimed is:

1. An interferometric temperature measurement system for measuring the temperature of a sample, said system comprising:

a laser source which sends a beam of electromagnetic radiation towards said sample;

a first detector which measures the intensity of a reflected beam of electromagnetic radiation reflected off of said sample;

said first detector being positioned on the axis of the reflected beam of electromagnetic radiation;

said electromagnetic radiation from said laser source having both S and P components, said S and P components being orthogonal to each other;

second and third detectors located off the axis of the reflected beam which measure the intensity of the S and P components respectively of the reflected beam of electromagnetic radiation;

a first polarizer, positioned on the axis of the reflected beam of electromagnetic radiation between the sample and the first detector which causes the S and P components of the electromagnetic radiation along orthogonal directions to interfere with each other prior to detection by said first detector;

a second polarizer, positioned on the axis of said reflected beam of electromagnetic radiation between the first polarizer and the sample, which causes the intensities of the S and P components of the radiation to be equal at a predetermined temperature;

first and second beam between the first and second polarizers splitters, positioned on the axis of the reflected beam, which divert a portion of the reflected radiation toward said second and third detectors respectively;

third and fourth polarizers, located off the axis of the reflected beam of electromagnetic radiation and in the path of said diverted portion of radiation from said first and second beam splitters respectively, such that only the S component of the diverted electromagnetic radiation will be received by said second detector and only the P component of said diverted electromagnetic radiation will be received by said third detector;

circuitry which receives signals from said first, second, and third detectors and which determines the temperature of said sample.

2. The system o claim 1 wherein said first polarizer which causes the S and P components of the electromagnetic radiation polarized along orthogonal directions to interfere with each other is a 135° polarizer.

3. The system of claim 1 wherein the circuitry which determines the temperature of the sample further comprises circuitry which calculates the quantity S(T), where $$S(T) = \frac{1}{2}\left[\frac{I/I_S' - \delta^2/I_S'}{1 + \delta/\sqrt{I_S'}}\right] \quad (15)$$

where the quantity $\delta$ is given by:

$$\delta = \sqrt{I_P'} - \sqrt{I_S'} \quad (16)$$

and where I si the intensity measured by the first detector, and $I_S'$ and $I_P'$ are linear transformations of the intensities measured by the second and third detectors, respectively.

4. The system of claim 1 further comprising a spatial filter, positioned on the axis of the reflected beam of electromagnetic radiation between the sample and the second polarizer which ensures that only a specularly reflected portion of reflected beam passes through to the second polarizer.

5. A method for determining the temperature of a sample comprising the steps of:
   polarizing electromagnetic radiation from a laser source reflected off of the sample such that S and P orthogonal components of electromagnetic radiation from said laser source interfere with each other;
   polarizing the reflected radiation from said laser source such that the S and P components are generally equivalent at a predetermined temperature;
   measuring the intensity of the interfered radiation, on the axis of the reflected radiation;
   measuring the intensity of the S component of the polarized reflected radiation having generally equivalent S and P components at a predetermined temperature, off the axis of the reflected radiation;
   measuring the intensity of the P component of the polarized reflected radiation having generally equivalent S and P components at a predetermined temperature, off the axis of the reflected radiation; and
   determining the temperature from the three measured intensities.

6. The method of claim 5 wherein the step of determining the temperature further comprises the step of determining the quantity S(T) where $$S(T) = \frac{1}{2}\left[\frac{I/I_S' - \delta^2/I_S'}{1 + \delta/\sqrt{I_S'}}\right] \quad (21)$$

where the quantity $\delta$ is given by:

$$\delta = \sqrt{I_P'} - \sqrt{I_S'} \quad (22)$$

and where I is the intensity measured by the first detector and $I_S'$ and $I_P'$ are linear transformations of the intensities measured by the second and third detectors, respectively.

* * * * *